United States Patent [19]

Fromme et al.

[11] 3,710,923
[45] Jan. 16, 1973

[54] ARTICLE SORTING INSTALLATION WITH AN ENDLESS CONVEYOR DISCHARGE MECHANISM

[75] Inventors: Hans-Georg Fromme, Wetzlar; Franz Nadler, Burgsolms; Siegfried Zimmer, Hermannstein; Kurt Weller, Dutenhofen, all of Germany

[73] Assignee: Fromme Forderanlagen GmbH, Wetzlar, Germany

[22] Filed: Sept. 25, 1970

[21] Appl. No.: 75,611

[30] Foreign Application Priority Data

Oct. 18, 1969 Germany...................P 19 52 643.3

[52] U.S. Cl...............198/81, 198/31 AA, 214/11 R
[51] Int. Cl..............................................B65g 37/00
[58] Field of Search............198/31 AA, 81; 214/11 R

[56] References Cited

UNITED STATES PATENTS 3,542,215  1/1969  Fromme et al.....................214/11 R
2,666,535  1/1954  Dooley.............................198/188 X Primary Examiner—Evon C. Blunk
Assistant Examiner—Douglas D. Watts
Attorney—Krafft & Wells

[57] ABSTRACT

An article sorting installation arranged above a main conveyor belt and being adapted to move the transported articles sideways off said conveyor belt onto one of a plurality of smaller delivery belts which transport the articles to their places of final destination. The installation includes two endless chains arranged in parallel above the main conveyor belt and rotating vertically with a velocity equal to that of the main conveyor belt. The chains are linked by bars with one stripper being arranged slideably on each bar. Guide rails are provided above and along the two sides of the main belt for guiding the strippers in lateral direction. Junction rails interconnect the guide rails, and switches are arranged at each intersection for guiding the strippers from the guide rails into the junction rails. The switches are controlled electromagnetically and are operated according to a predetermined program for guiding simultaneously a plurality of strippers transversely across the conveyor belt, each stripper moving in a separate junction rail and all strippers being aligned in the direction of the belt travel. In the place of separate strippers at least two strippers may be connected to form a unit which is directed by only one switch to move in only one junction rail transversely across the main conveyor belt, thereby pushing an article off the main conveyor belt onto one of the delivery belts.

4 Claims, 5 Drawing Figures

3,710,923

PATENTED JAN 16 1973

HANS-GEORG FROMME
FRANZ NADLER
SIEGFRIED ZIMMER
KURT WELLER
    INVENTORS

BY *Krafft & Wells*

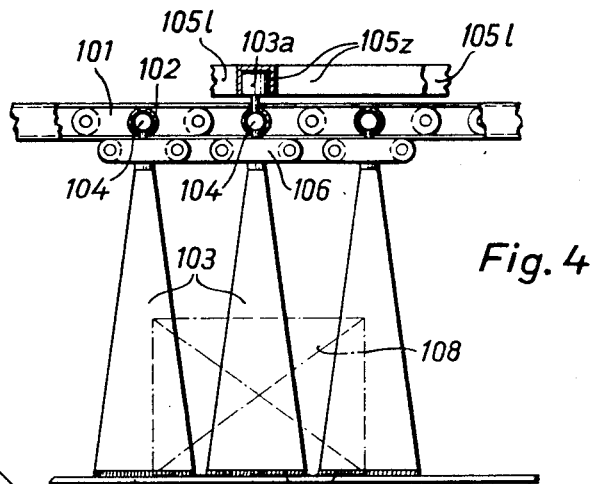
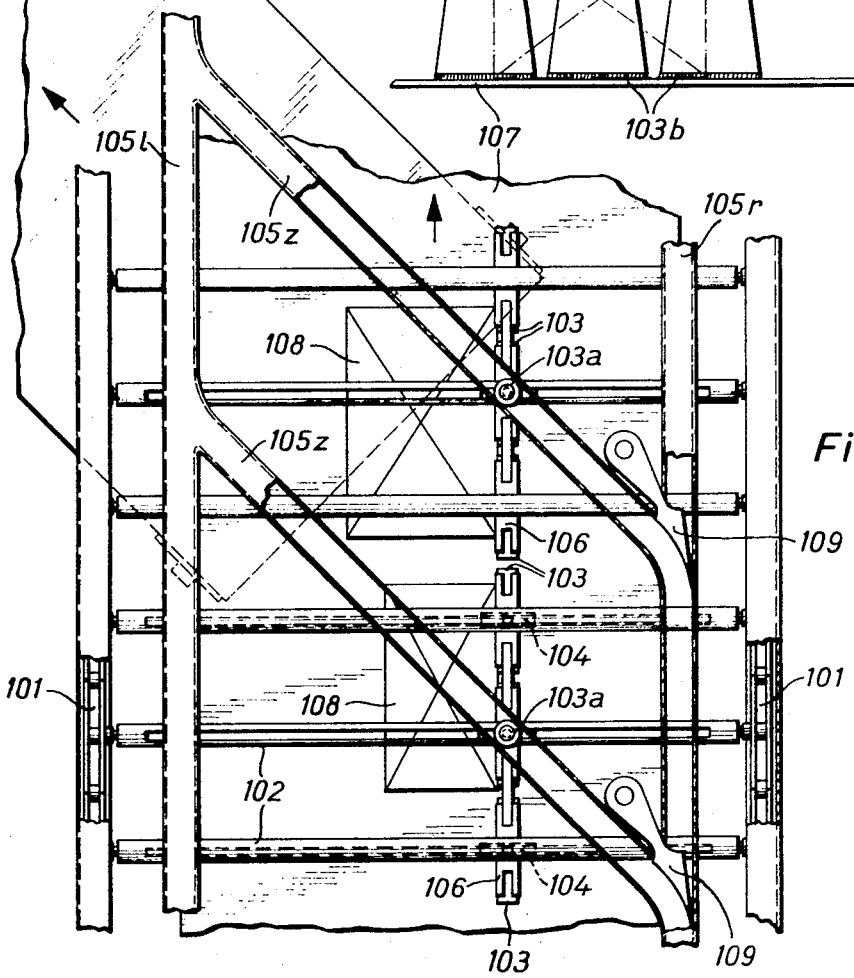

ARTICLE SORTING INSTALLATION WITH AN ENDLESS CONVEYOR DISCHARGE MECHANISM

CROSS-REFERENCE TO RELATED APPLICATIONS

Applicants claim priority under 35 USC 119 for application Ser. No. P 19 52 643.3, filed in the Patent Office of the Federal Republic of Germany on Oct. 18, 1969.

Applicants incorporate by reference the disclosure of copending application Ser. No. 709,967, filed Jan. 14, 1969, now U.S. Pat. No. 3,542,215 having the same assignee as the present invention. Particular reference is made to the description of the preferred embodiment of said application of which the reference numbers correspond to the numbers used in the FIGS. 1–3 of the present application.

BACKGROUND OF THE INVENTION

The invention relates to an article sorting installation of the type used in mail order houses, post offices, train stations, air terminals etc.

The present invention is an improvement on the sorting installation disclosed in application Ser. No. 790,967 now U.S. Pat. No. 3,542,215 which comprises two endless chains above and in parallel to the sides of a main conveyor belt which chains rotate vertically with a velocity equal to that of the belt. The chains are linked to each other by hollow slotted bars that extend perpendicularly to the direction of movement of the chains and each bar carries a stripper which is arranged slideably on the bar. Two guide rails for the strippers are also mounted above and in parallel to the edges of the belt, and junction rails are arranged between the guide rails, which junction rails extend transversely across the belt. The guide rails and the junction rails are interconnected by means of electromagnetically operated switches.

In the upper tract of the chains, where the latter travel in a direction opposite to the direction of movement of the conveyor belt the strippers are guided by a rail in the middle between the two chains. A switch is provided at the front end of the installation for directing one or more strippers from the middle rail to the left-hand side guide rail or the right-hand side guide rail and other switches are arranged for guiding the strippers from the guide rails to one particular junction rail and from there to the opposite guide rail. As a consequence thereof the strippers move transversely across the conveyor belt, either from the left to the right or vice versa, and, since they extend down to just above the belt surface, they push a piece of luggage to the one side or to the other side off the belt at predetermined places.

There is, however, a problem inherent in the above described installation. If, for example, an article of greater size is to be transported and discharged, more than one stripper is needed for pushing the article off the conveyor. In the prior art installation all the required strippers are directed by one switch into only one junction rail wherein they travel, one behind the other, transversely across the conveyor belt. Consequently the strippers come into contact with the articles on the belt not simultaneously but successively. This causes the article to turn on the main belt through an angle under which the strippers travel relative to the main belt from one guide rail to the other, i.e., the article, for example a piece of luggage, is turned by the strippers until one side of the article is parallel to the direction in which the strippers move. If, however, several articles or pieces of goods follow closely one behind the other the leading piece may block the following pieces by this turning motion.

It is therefore the object of the present invention to improve the article sorting installation as disclosed in application Ser. No. 790,967, now U.S. Pat No. 3,542,215 in a manner that will prevent the transported articles from being turned so that the latter will rather be moved sideways in parallel relative to their original position on the main conveyor belt.

SUMMARY OF THE INVENTION

According to the present invention the above described disadvantage of the prior art installation is overcome by guiding a plurality of strippers in such a manner transversely across the conveyor belt that an imaginary line connecting the strippers remains parallel to the direction of movement of the conveyor belt.

This can be accomplished either by guiding a plurality of separate strippers by a corresponding number of switches simultaneously into a corresponding number of junction rails, so that one stripper each moves in one particular junction rail, but all strippers move together in alignment transversely across the conveyor belt. The number of separate strippers which must be guided in this manner depends, of course, on the length of the longest article to be transported. Since, however, it proves somewhat difficult to judge in advance the correct number of strippers required in view of the length of one particular article and to program the corresponding number of switches it is, further, suggested to connect mechanically a plurality of strippers — at least two but preferably three — so as to form a unit which has only one head portion by means of which this unit is guided in the rails and in the junction rails. Such a unit can be directed by one switch only and needs only one rail for guidance.

If the article is extremely long there may be, of course, two units simultaneously guided by two different switches into two adjacent junction rails. Thereby the number of strippers discharging this article will be doubled. Both embodiments of the invention have the same effect that the articles do not turn or pivot on the conveyor belt during their discharge onto a delivery belt.

BRIEF DESCRIPTION OF THE DRAWINGS

The invention will be more fully comprehended from the following description when taken in conjunction with the appending drawings, wherein:

FIG. 4 shows three strippers connected to one another to form a mechanical unit, and FIG. 5 is a top view of the installation in front of one of the delivery belts, the rails broken away in parts.

DESCRIPTION OF THE PREFERRED EMBODIMENTS

Figure 1:
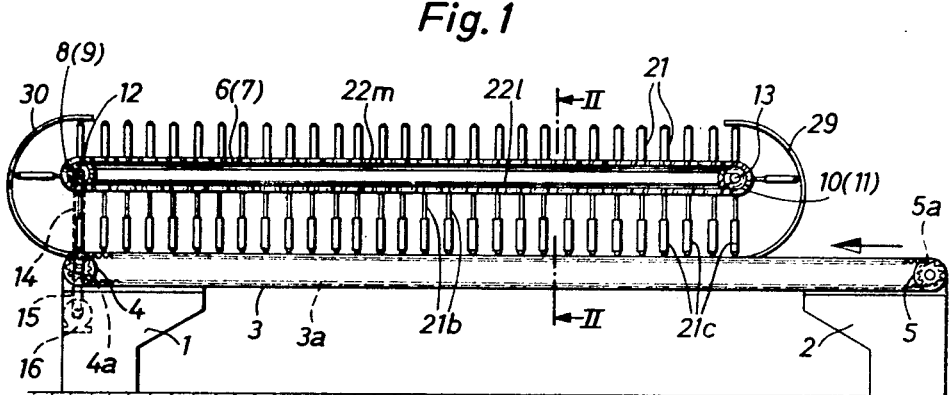
FIG. 1 is a schematic elevational view of an article sorting installation with an endless conveyor discharge mechanism.

Referring now to FIG. 1 the main conveyor belt 3 is suspended between two drums 4 and 5 which are supported in bearings on the two stands 1 and 2 respectively. The conveyor belt 3 is on its inner surface provided with a flexible rack 3a which is in mesh with gears 4a (5a) on the drums 4 and 5.

Above the conveyor belt 3 there are arranged two endless chains 6,7 at a distance from one another which is greater than the width of the conveyor belt. The chains rotate vertically along an oblong path and in parallel to the sides of the belt. Two shafts 12 and 13 are supported stationarily but rotatably overhead belt 3, and two chain wheels 8,9 and 10,11 are mounted on each shaft. The chain wheels carry and drive the chains. Drum 4 and shaft 12 with the chain wheels 8,9 are driven synchronously by motor 16 and by means of belts or chains 14 and 15.

Figure 2:
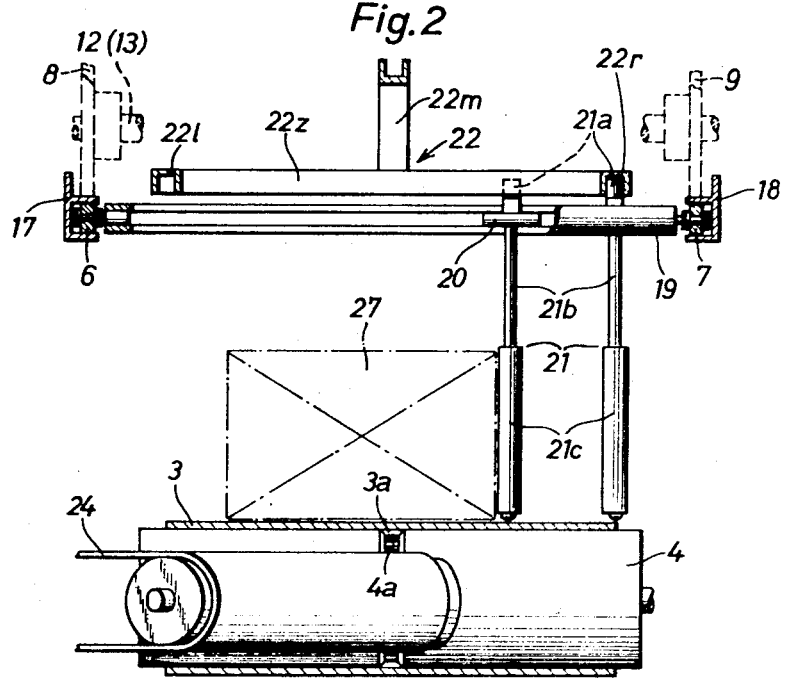
FIG. 2 is a sectional view of a sorting installation, cut in front of one of the delivery belts.

Between the return points, i.e., between the chain wheels 8,10 and 9,11 the chains are guided in rails 17,18 (FIG. 2) and are interconnected at regular intervals by slotted bars 19 wherein strippers 21 are laterally displaceable by means of guide blocks 20. Each stripper 21 comprises a head portion 21a and the working portions 21b and 21c which are foldable in a telescopic manner.

Figure 3:
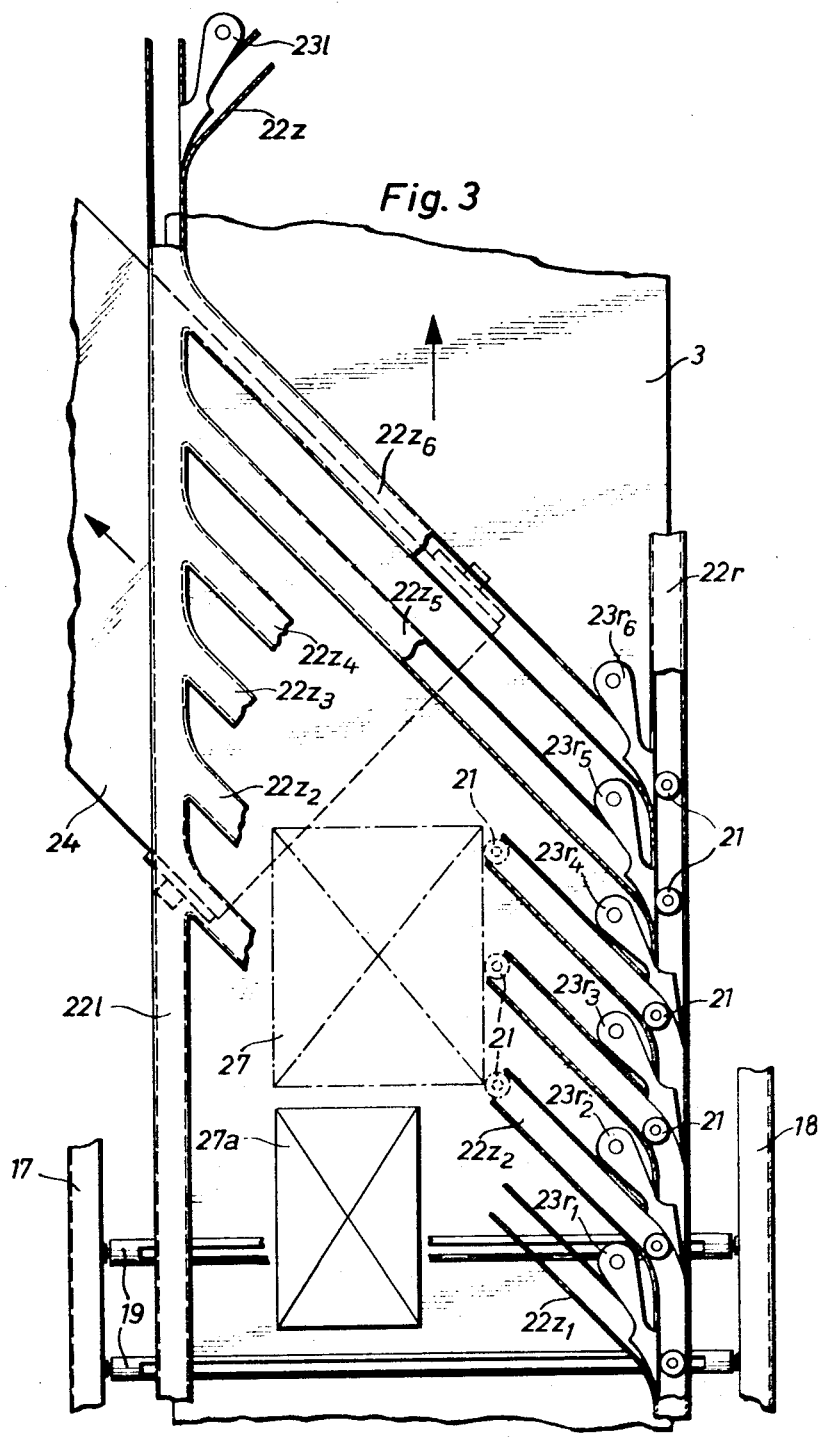
FIG. 3 is a top view of the guide rails and the junction rails above the conveyor belt with the strippers shown in two different positions, one position indicated in dotted lines.

The head portions 21a move along all of the oblong path in guide rails 22 which in the upper tract of the path consist of only one rail 22m arranged in the middle. This middle rail 22m, however, forks in front of the chain wheels 8,9 and 10,11 in two different rails, namely a left-hand side guide rail 22l and a right-hand side guide rail 22r. The guide rails 22l and 22r are interconnected by junction rails 22z which extend from the right-hand side of the left-hand side or vice versa. At the points of intersection between the guide rails and the junction rails switches 23l and 23r are installed (FIG. 3). Around the chain wheels 8,9 and 10,11 respectively are arranged two pieces of curved sheet metal 29,30 (FIG. 1). Piece 30 serves to gradually fold the working portions 21b and 21c of each stripper 21 as the latter swings upward around chain wheels 8,9 from its lower path to its upper return path while piece 29 serves to unfold these working portions gradually when the stripper swings around chain wheels 10,11 from the upper path to the lower path.

At the places of article discharge delivery conveyors 24 are arranged which rotate in a direction inclined to the direction of rotation of the main conveyor belt 3. The articles to be transported and sorted are designated 27 and 27a.

Opposite to the place of discharge, where the delivery conveyor 24 extends to the left (FIG. 3), six switches $23r_1$ through $23r_6$ are mounted in the right-hand side guide rail 22r from which an equal number of junction rails $22z_1$ through $22z_6$ extend from the right-hand side guide rail 22r to the left-hand side guide rail 22l. Since the article to be transported corresponds in length only to the distance of three strippers 21, only three switches, namely the switches $23r_2, 23r_3$ and $23r_4$, are actuated, i.e., they are brought in a position where they guide strippers from the right-hand side guide rail to the junction rails. The other strippers, both ahead and behind, continue to move straight ahead in the guide rail 22r.

Depending on what place of discharge the article 27 is to be pushed off the main conveyor, a command for a switch in the upper path of the strippers (not shown) is stored at the feeding place where the article is deposited on the belt so that this switch guides a number of strippers corresponding to the length of the article 27 into the right-hand side guide rail 22r. At the same time commands are stored for a number of switches $23r_1$ through $23r_6$ of which the distance corresponds to the length of the article. In the present example commands are stored for the switches $23r_2, 23r_3$ and $23r_4$. After the strippers have turned around the chain wheels 10,11 the working portions 21b and 21c are unfolded and their lower end reaches just above the conveyor belt 3.

At precisely the same moment when the article 27 on the conveyor belt 3 has reached the delivery belt 24 whereon it is to be discharged the predetermined three strippers 21 have reached the tongues of the switches $23r_2, 23r_3$ and $23r_4$ respectively. The tongues pivot simultaneously into the guide rail 22r, i.e., in the way of the strippers 21, thereby guiding each stripper from rail 22r into one particular junction rail $22z_2, 22z_3, 22z_4$. FIG. 3 shows three strippers 21 in contact with the tongues of the switches $23r_2, 23r_3$ and $23r_4$ immediately after the tongues have moved into the path of the strippers. Further, FIG. 3 shows in dotted lines the strippers 21 in contact with article 27. From this Figure it will be readily understood that the article 27 is pushed off the conveyor belt 3 in a direction perpendicular to the direction of movement of the belt and without any turning or pivoting motion. The following article 27a is thus in no way blocked or jammed.

In the embodiment illustrated in the FIGS. 4 and 5 the chains 101 carry the ends of bars 102 wherein strippers 103 are laterally displaceable by means of their guide blocks 104. This displacement occurs perpendicular to the plane of drawing of FIG. 4. The strippers 103 are mechanically connected with one another by means of chain links 106. This interconnection is rigid in the horizontal direction, however, it is flexible in the vertical direction. The intermediate stripper 103 is provided with a head portion whereon a roller 103a is mounted. Only this one head portion, for all three strippers, is guided in the junction rail 105z. In this embodiment of the invention the strippers have the shape of flat pyramids. Their base in the direction of the main conveyor belt 3 is so long that there is only a small gap left between two adjacent strippers. Further, each base is underneath provided with brushes so that even flat articles can be moved off the conveyor belt. The articles are designated by the numeral 108 in the FIGS. 4 and 5.

The strippers 103 approach a place of discharge, for example in the right-hand side guide rail 105r, and are guided into the junction rails 105z by the tongues of switches 109. There they come in contact with the articles 108 and push the latter off the conveyor belt 103 onto a delivery belt 110. Thereafter the strippers slide into the left-hand side guide rail 105 l from where they move through the upper tract of the installation back to their starting position.

What is claimed is:

1. An article sorting installation with an endless conveyor discharge mechanism for moving transported articles sideways off conveyor belt (3) onto one of a plurality of delivery belts (24), said installation including endless chains (6,7) arranged in parallel to either side of said conveyor belt, each chain rotating vertically along an oblong path between two chain wheels (8,10; 9, 11) and wherein slotted hollow bars (19) connect opposite links of both chains, with strippers (21) being slidably mounted on said bars; the installation including further a middle guide rail adapted to guide said strippers in the middle when said strippers move along the upper tract of said oblong path, and two side guide rails (22 l, 22r) adapted to guide said strippers in parallel to the sides of said conveyor belt when said strippers move along the lower tract of said oblong path, and with junction rails (22z) interconnecting said guide rails by means of switches (23r) arranged at the intersection of said side guide rails and said junction rails, said switches being adapted to guide said strippers from said side guide rails to either one of said junction rails, wherein the improvement comprises means for maintaining a plurality of adjacent strippers aligned in the direction of the conveyor belt and for guiding simultaneously said plurality of adjacent strippers transversely across the conveyor belt from one guide rail via said junction rails into the opposite guide rail at one of said delivery belts, said means comprising a plurality of switches arranged in the guide rail opposite to the end of a delivery belt and a corresponding number of junction rails allocated to said switches, said switches being operated simultaneously for simultaneously guiding one separate stripper into each junction rail.

2. An article sorting installation with an endless conveyor discharge mechanism for moving transported articles sideways off conveyor belt (3) onto one of a plurality of delivery belts (24), said installation including endless chains (6, 7) arranged in parallel to either side of said conveyor belt, each chain rotating vertically along an oblong path between two chain wheels (8, 10; 9, 11) and wherein slotted hollow bars (19) connect opposite links of both chains, with strippers (21) being slidably mounted on said bars; the installation including further a middle guide rail adapted to guide said strippers in the middle when said strippers move along the upper tract of said oblong path, and two side guide rails (22 l, 22r) adapted to guide said strippers in parallel to the sides of said conveyor belt when said strippers move along the lower tract of said oblong path, and with junction rails (22z) interconnecting said guide rails by means of switches (23r) arranged at the intersections of said side guide rails and said junction rails, said switches being adapted to guide said strippers from said side guide rails to either one of said junction rails, wherein the improvement comprises means for maintaining a plurality of adjacent strippers aligned in the direction of the conveyor belt and for guiding simultaneously said plurality of adjacent strippers transversely across the conveyor belt from one guide rail via said junction rails into the opposite guide rail at one of said delivery belts, said means comprising a plurality of strippers rigidly interconnected and aligned in the direction of movement of the conveyor belt to form a unit, said unit being provided with one head portion for guiding said unit in said rails, and at least one switch and one junction rail being arranged opposite to a delivery belt for guiding said unit transversely across said conveyor belt.

3. An article sorting installation as claimed in claim 2, wherein said unit comprises three strippers interconnected by chain links, and wherein the head portion is provided on the intermediate stripper.

4. An article sorting installation as claimed in claim 2, wherein two switches and two junction rails are provided opposite to the end of each delivery belt and wherein the distance between said junction rails is at least equal to the distance of three strippers.

* * * * *